United States Patent Office 3,651,169
Patented Mar. 21, 1972

---

3,651,169
EPOXY RESIN, AMINE OR AMIDEALDEHYDE, AND ORGANIC ESTER OF PHOSPHORIC ACID OR ORGANIC SULFONIC ACID
Lem Davis, Jr., Lake Jackson, Tex., assignor to The Dow Chemical Company, Midland, Mich.
No Drawing. Filed Sept. 8, 1970, Ser. No. 70,536
Int. Cl. C08g 45/10
U.S. Cl. 260—834                              7 Claims

ABSTRACT OF THE DISCLOSURE

A thermosettable resin composition containing (A) a hydroxyl-containing resin, (B) a urea-aldehyde resin or a melamine-aldehyde resin, and (C) as a catalyst or reaction promoter, an alkyl or aryl ester of phosphoric acid or an alkyl or aralkyl ester of an organic sulfonic acid.

BACKGROUND OF THE INVENTION

This invention relates to a thermosettable resin composition comprising (A) a hydroxyl-containing resin, (B) a urea-aldehyde or melamine-aldehyde resin and (C) an acid ester catalyst or reaction promoter.

It is known that melamine aldehyde and urea-aldehyde resins react with hydroxyl-containing resins. It is also known that acids will promote the reaction of hydroxyl-containing resins with the aforementioned urea-aldehyde and melamine-aldehyde resins (Handbook of Epoxy Resins, Lee and Neville, McGraw-Hill Book Co., chapt. 10, page 15, chapt. 24, page 25). However, such known systems tend to have a short shelf life thereby limiting their preparation to quantities which will be consumed in relatively short times and rendering them unsuitable for storage in warehouses and the like for extended periods of time. Resins having improved shelf life would therefore be highly desirable in the national and international distribution of formulated coating systems and the like.

It is an object of this invention to provide improved hydroxyl-containing resin compositions.

It is a further object of the present invention to pro- (III)
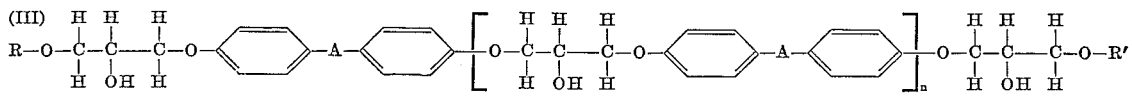

vide latent curing hydroxyl-containing resin compositions having extended shelf stability.

These and other objects and advantages of the present invention will become apparent throughout the specification.

The composition of the present invention comprises, in intimate admixture, (A) a hydroxyl-containing resin, (B) a melamine-aldehyde resin or a urea-aldehyde resin and (C) an alkyl or aryl ester of phosphoric acid or an alkyl or aralkyl ester of an organic sulfonic acid.

Suitable hydroxyl-containing resins for use in the composition of the present invention include hydroxyl-con- (IV)
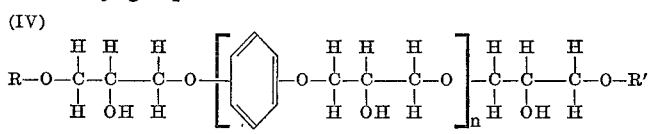

taining epoxy resins, capped hydroxyl-containing epoxy resins, and the like.

(V)
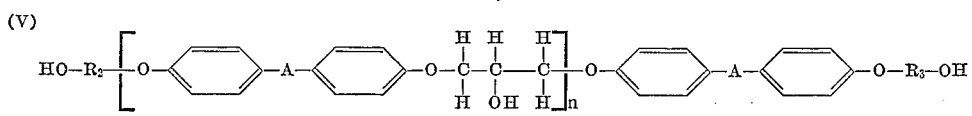

The hydroxyl-containing epoxy resins include those resins which are represented by the following general formulae and includes mixtures thereof.

(I)
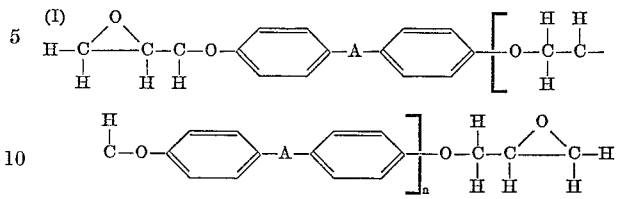

wherein A is selected from the group consisting of an alkylene or alkylidine group having from about 1 to about 4 carbon atoms, —O—, —S—, —S—S—,

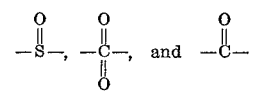

and wherein $n$ is a number such that the average molecular weight of the resin is from about 850 to about 11,000 and preferably from about 3,200 to about 4,500.

(II)
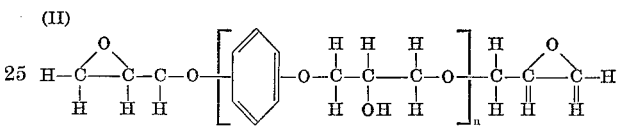

wherein $n$ is the same as in Formula I.

The resins represented by Formulae I and II are prepared by the reaction of a bisphenol type compound or a dihydroxy benzene with an epihalohydrin in the presence of sodium hydroxide at elevated temperatures. The molecular weight or value of $n$ obtained depends upon the molecular weight desired. This and other methods for the preparation of these resins are well known by those familiar with the epoxy resin art.

For convenience, the resins exemplified by the Formulae I and II will be referred to as aromatic based or aromatic-containing, hydroxyl-containing epoxy resinh.

The capped hydroxyl-containing epoxy resins which may be employed in the present invention are represented by the following general formulae and includes mixtures thereof.

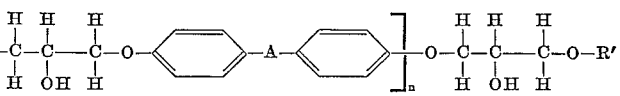

wherein A and $n$ are as defined in Formula I and wherein R and R' are independently selected from the group consisting of an alkyl group having from about 1 to about 4 carbon atoms, a group represented by the formula

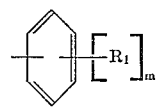

wherein $m$ is a whole number from 1 to 2 and $R_1$ is selected from the group consisting of hydrogen and an alkyl group of from about 1 to about 4 carbon atoms.

wherein R, R' and $n$ are as defined in Formula III.

wherein $R_2$ and $R_3$ are alkylene or alkyl substituted alkylene groups of from about 2 to 4 carbon atoms and $n$ is as defined in Formula I.

(VI)
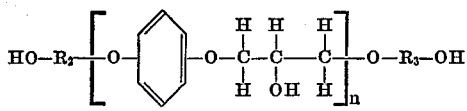

wherein $R_2$, $R_3$ and $n$ are as defined in Formula V.

The hydroxyl-containing resins represented by the Formulae III, IV, V and VI are described and a method for their preparation is given in U.S. 2,456,408. As to those resins illustrated by the Formulae I and II, those familiar with the epoxy resin art can prepare these resins with little difficulty.

The resins represented by the Formulae III, IV, V and VI will hereinafter be referred to as capped hydroxyl-containing aromatic-based or aromatic-containing epoxy resins.

It is obvious from the Formulae I, II, III, IV, V and VI that partially capped resins are possible and can be prepared by using less quantities of the capping or terminating reactant than would be required to cap or terminate all the epoxy groups in the resin. It is desired that these partially capped or terminated resins be included also in the term capped hydroxyl-containing aromatic-based or aromatic-containing epoxy resins.

The melamine-aldehyde resins suitable for use in the present invention include those in which substantially all of the active amino hydrogen groups of melamine have been replaced with alkylol groups. However, since the melamine-aldehyde resins tend to polymerize over a period of time thus forming dimers, trimers and higher polymers, it is widely known that this tendency to form dimers, trimers and higher polymers can be substantially reduced or eliminated by partially etherifying the resins. In so far as the present invention is concerned, it is preferred, although it is not essential, that the melamine-aldehyde resins by partially etherified, i.e. up to and including about 80% of the active hydrogens have been etherified.

Suitable such partially etherified melamine-aldehyde resins include the partially methylated resins the partially ethylated resins, the partially propylated resins, the partially butylated resins and the like.

In practice of this invention either the non-alkylated or partially alkylated monomeric, dimeric, trimeric or lower polymeric forms of the reaction product of melamine and an aldehyde may be employed. The monomeric form is preferred but is not essential. For simplicity, the use herein of the terms melamine-aldehyde resins and partially alkylated melamine-aldehyde resins refer to any of the forms i.e. monomeric, dimeric, trimeric or lower polymeric forms of the respective non-alkylated or partially alkylated products resulting from the reaction of melamine with an aldehyde including the partially etherified products thereof. Suitable such aldehydes include formaldehyde, acetaldehyde, propionaldehyde, butyraldehyde and the like.

The melamine-aldehyde resins are generally prepared by the reaction of melamine with aqueous formaldehyde or other suitable aldehyde under slightly basic conditions.

The partially alkylated melamine-aldehyde resins are prepared by reacting the melamine-aldehyde resin with an alcohol under slightly acidic conditions. Preferably, such aldehydes include formaldehydes, acetaldehyde propionaldehyde, butyraldehyde and the like. The melamine-aldehyde resins and partially alkylated melamine-aldehyde resins are commercially available products.

The urea-aldehyde resins suitable for use in this invention are those resins resulting from the reaction of urea with an aldehyde. The partially alkylated forms of these resins may also be employed.

These urea-aldehyde resins and their preparation are well known and are prepared by the reaction of urea with aqueous formaldehyde or other suitable aldehyde such as acetaldehyde, propionaldehyde, butyraldehyde and the like in a slightly basic medium.

The partially alkylated urea-aldehyde resins are prepared by reacting the urea-aldehyde resin with an alcohol under slightly acidic conditions. The urea-aldehyde resins and partially alkylated urea-aldehyde resins are available commercially.

The catalysts or reaction promoters which are employed in and form the basis of the present invention are the alkyl and aryl esters of phosphoric acid and the alkyl and aralkyl esters of an organic sulfonic acid. Suitable such phosphoric acid esters are those represented by the formula:

(VII)
$$R_3-O-\overset{\overset{O}{\|}}{\underset{\underset{R_2}{|}}{P}}-O-R_1$$

wherein $R_1$, $R_2$ and $R_3$ are independently selected from the group consisting of an alkyl group having from about 2 to about 6 carbon atoms and the group represented by the formula

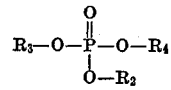

wherein $R_4$ and $R_5$ are independently selected from the group consisting of hydrogen and an alkyl group having from about 1 to about 4 carbon atoms.

Suitable such esters of an organic sulfonic acid are those represented by the formula, (VIII)
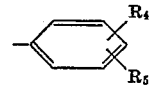

wherein $R_6$ and $R_7$ are independently selected from the group consisting of hydrogen and an alkyl group having from about 1 to about 4 carbon atoms and wherein $R_8$ is selected from the group consisting of an alkyl group having from about 2 to about 6 carbon atoms and a group represented by the formula

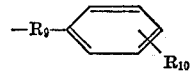

wherein $R_9$ is an alkylene group having from about 1 to about 4 carbon atoms and $R_{10}$ is hydrogen or an alkyl group having from about 1 to about 18 carbon atoms.

Particularly suitable catalysts or reaction promoters are diisobutyl monopropyl phosphate, tricresyl phosphate, triethyl phosphate and isobutyl-p-toluene sulfonate.

The hydroxyl-containing resins (A) and the urea-aldehyde or melamine-aldehyde resins (B) are employed in a ratio by weight of A:B of from about 1:1 to about 8:1 and preferably from about 3:1 to about 5:1.

The acid ester catalyst or reaction promoter (C) is present in the compositions of this invention in quantities which will provide from about 0.5 to about 4.0 and preferably from about 1.0 to about 3.0 milliequivalents of acid for each 10 parts by weight of the hydroxyl-containing resin (A) plus the melamine-aldehyde or urea-aldehyde resin (B). The above quantity of the acid ester promoter expressed as milliequivalents of acid denotes that quantity of acid which would be obtained as a result of the complete hydrolysis of the acid ester employed.

The particular quantities employed will depend upon the physical and chemical resistant properties that is desired in the thermoset product. Those persons skilled in the art can vary the quantities of A and B to suit the particular end use and properties desired of the thermoset composition.

Because the hydroxyl-containing polymers, the alkylated and non-alkylated urea-aldehyde resins and the alkylated and non-alkylated melamine-aldehyde resins vary from viscous liquids to solids, they are difficult to handle in a convenient manner, and it is therefore desirable then that they be employed as solutions. Suitable solvents for such resins are the aromatic solvents, alcohols, polyhydric alcohols, partially etherified polyhydric alcohols, ketones and mixtures thereof and the like. It is only important that the solvent be non-reactive with the components employed in the compositions of this invention, however, benzene, toluene, xylene, ethanol, isopropanol, butanol, ethylene glycol, propylene glycol, monomethyl ethers of ethylene and propylene glycols, acetone, methyl ethyl ketone, are particularly suitable for most such resins.

The quantity of solvent to be employed depends upon the particular use or application for which the composition is intended. For castings and the like, the compositions are generally diluted to viscosities of from about 50 to about 500 poises. For coatings and the like, viscosities of from about 0.5 to about 3.0 poise are usually employed. Also, the particular method of coating, such as brushing, spraying, dipping and the like, usually determines the particular amount of solvent dilution desired.

The compositions of this invention are useful as coatings for various substrates such as metals, wood and the like. They may be modified with various fillers and pigments normally employed in coatings without detracting from the scope of the invention.

The following examples are illustrative of the present invention, but are not to be construed as limiting the scope thereof in any manner.

EXAMPLE 1

To each of several containers was added 16 grams of a 50% by weight resin solution of D.E.R.® 667 (a diglycidyl ether of bisphenol A (p,p'-isopropylidine diphenol) type resin having a molecular weight of about 3200) in a 1/1 mixture by weight of xylene and Dowanol® EEA [ethylene glycol ethyl ether acetate $(CH_3COOC_2H_4OC_2H_5)$]

and 3.4 grams of a 60% solution by weight of an alkylated urea-formaldehyde resin (Beckamine® P–138–60) in a 1/1 mixture by weight of xylene and butanol. Then to each of the containers was added 5 grams of a 1/1 mixture by weight of xylene and Dowanol® EEA which contained 3.0 milliequivalents (based on the resultant acid of the hydrolyzed ester) of various catalysts shown in the following Table I.

Following mixing, a Gardner Viscosity tube was filled with a portion of the contents of each tube and the viscosity measured using Gardner Viscosity Standards. The viscosity was checked periodically as shown in Table I. The remaining sample was used to prepare samples for physical and chemical testing as follows:

A portion was spread on a cold rolled steel "Q" panel using a #18 Meyer, wire wrapped rod. Panels were then stored overnight to allow solvent evaporation and baked the following morning at the temperature(s) indicated in the table.

Impact testing was carried out using a Gardner Inpact Tester.

Flexibility was tested on a ⅛" conical Mandrel Blender.

TABLE I

| | Sample | | | | |
|---|---|---|---|---|---|
| | A | B | C | D | E |
| Resin¹ solution (grams) | 16.0 | 16.0 | 16.0 | 16.0 | 16.0 |
| Beckamine® ² P-138-60 (grams) | 3.4 | 3.4 | 3.4 | 3.4 | 3.4 |
| Debutyl monopropyl phosphate, grams | | .253 | | | |
| Isobutyl p-toluene sulfonate, grams | | | .756 | | |
| Tricresylphosphate, grams | | | | .368 | |
| Triethyl phosphate, grams | | | | | .182 |
| H₃PO₄, grams (prior art comparison) | .0980 | | | | |
| Dowanol® EAX³ (50/50 mixture of xylene/Dowanol® EEA) | 5.0 | 5.0 | 5.0 | 5.0 | 5.0 |
| Initial viscosity (Gardner) | Q-R | Q | A-R | R | O-P |
| Viscosity (Gardner): | | | | | |
| 2 days | U | R | S | S | R |
| 5 days | Z₁ | R | S | S | R |
| 12 days | (⁴) | T-U | T | T | R |
| 20 days | (⁴) | T-U | T-U | T | R |
| 33 days | (⁴) | U-V | U | T-U | R |
| 49 days | (⁴) | U-V | U | T U | R |
| 135 days | (⁴) | (⁴) | W-X | U | T-U |
| 372 | (⁴) | (⁴) | Z | U-V | U-V |
| After 30 minutes 250° F. bake impact resistance: | | | | | |
| Forward | >200 | >200 | >200 | 25 | 25 |
| Reverse | >200 | >200 | >200 | <10 | <10 |
| Sward hardness | 27.4 | 40.0 | 46.0 | 38.6 | 34.6 |
| 30 minutes, 300° F. bake impact resistance: | | | | | |
| Forward | 65 | >200 | 200 | 175 | >200 |
| Reverse | 40 | >200 | >200 | >200 | >200 |
| Sward hardness | | | 40.0 | | |

¹ 50% solution of D.E.R.® 667 in a 1/1 mixture of xylene/Dowanol® EEA.
² 60% solution of a butylated urea-formaldehyde resin in a xylene/butanol (1/1 mixture by weight).
³ 1/1 mixture by weight of xylene and $CH_3COOC_2H_4OC_2H_5$.
⁴ Gelled.

EXAMPLE 2

The procedure of Example 1 was followed except that the catalyst levels were 1.0 milliequivalent instead of 3.0 milliequivalents. The results are given in the following Table II.

TABLE II

| | Sample | | | | |
|---|---|---|---|---|---|
| | A | B | C | D | E |
| Resin solution, grams | 16.0 | 16.0 | 16.0 | 16.0 | 16.0 |
| Beckamine® P-138-60, grams | 3.4 | 3.4 | 3.4 | 3.4 | 3.4 |
| Dibutyl monopropyl phosphate, grams | | 0.85 | | | |
| Isobutyl-p-toluene sulfonate, grams | | | .252 | | |
| Tricresyl phosphate, grams | | | | .123 | |
| Triethyl phosphate, grams | | | | | .061 |
| H₃PO₄, grams (prior art comparison) | .0328 | | | | |
| Dowanol® EAX, grams | 5.0 | 5.0 | 5.0 | 5.0 | 5.0 |
| Initial viscosity, Gardner | 0 | N-0 | 0 | M-N | 0 |
| Viscosity, Gardner: | | | | | |
| 1 day | T | T-U | T | R | T-U |
| 6 days | T-U | R-S | T | R | R-S |
| 14 days | V-W | T | T-U | T | U |
| 23 days | X-Y | T-U | T-U | T | T-U |
| 35 days | Z₁-Z₂ | T-Y | T-U | T-U | T |
| 75 days | (¹) | U-V | T-U | T-U | T-U |
| 365 days | (¹) | Z₃-Z₄ | V | U | U-V |
| 30 minutes at 300° F. Bake impact resistance: | | | | | |
| Forward (in.-bls.) | >200 | >200 | >200 | >200 | >200 |
| Reverse | >200 | >200 | >200 | >200 | >200 |
| Sward hardness | | | 48.0 | | |

¹ Gelled.

EXAMPLE 3

The procedure of Example 1 was employed except that the catalyst level was 1.5 milliequivalents instead of 3.0 milliequivalents. The results are given in the following Table III.

TABLE III

| | Sample | | | | |
|---|---|---|---|---|---|
| | A | B | C | D | E |
| Resin solution, grams | 16.0 | 16.0 | 16.0 | 16.0 | 16.0 |
| Beckamine® P-138-60, grams | 3.4 | 3.4 | 3.4 | 3.4 | 3.4 |
| Dibutyl monopropyl phosphate, grams | | .127 | | | |
| Isobutyl-p-toluene sulfonate, grams | | | .370 | | |
| Tricresyl phosphate, grams | | | | .185 | |
| Triethyl phosphate, grams | | | | | .092 |
| H₃PO₄, grams (prior art comparison) | .0489 | | | | |
| Dowanol® EAX, grams | 5.0 | 5.0 | 5.0 | 5.0 | 5.0 |
| Initial viscosity | R | Q | N | V-W | O |
| Viscosity: | | | | | |
| 2 days | U | T-U | R-S | W-X | R |
| 10 days | Y | V | R-S | X | R-S |
| 21 days | >>>>Z₁ | X-Y | T | X | R-S |
| 61 days | (¹) | (¹) | T-U | X-Y | T |
| 352 days | (¹) | (¹) | V-W | Y-Z | U |
| 30 minutes at 300° F. bake; impact resistance: | | | | | |
| Forward | 150 | >200 | >200 | 160 | >200 |
| Reverse | 140 | >200 | >200 | >200 | >200 |
| Sward hardness | | | 45.1 | | |
| 30 minutes at 250° F.; impact resistance: | | | | | |
| Forward | >200 | 180 | >200 | 50 | 45 |
| Reverse | >200 | >200 | 185 | >10 | >10 |
| Sward hardness | 32.7 | | 39.6 | | |

¹ Gelled.

EXAMPLE 4

To each of several containers was added 16 g. of a 50% by weight solution of a phenyl capped bisphenol A type epoxy resin having an average molecular weight of about 10,468, in a 1/1 mixture by wt. of Dowanol® EAX and 3.4 g. of a 60% solution by wt. of a butylated urea-formaldehyde resin (Beckamine® P-138-60) in a 1/1 mixture by wt. of xylene and butanol. Then 5.0 g. of a 1/1 mixture by wt. of xylene and Dowanol® EEA which contained milliequivalents of the various catalysts shown in the following Table IV. Testing was the same as in Example 1.

TABLE IV

| | Sample | |
|---|---|---|
| | A | C |
| Resin solution, grams | 16.0 | 16.0 |
| Beckamine ®P-138-60, grams | 3.4 | 3.4 |
| Isobutyl p-toluene sulfonate, grams | | 0.370 |
| p-Toluene sulfonic acid, grams ¹ | .281 | |
| Solvent, grams | 5.0 | 5.0 |
| Initial viscosity | L-M | T |
| Viscosity: | | |
| 16 hours | Z₄-Z₅ | |
| 24 hours | (²) | U-V |
| 17 days | (²) | W-X |
| 30 minutes bake at 350° F.; Sward hardness | (³) | 24.0 |
| Impact: | | |
| Forward | (³) | >200 |
| Reverse | (³) | >200 |

¹ Prior art example for comparative purposes.
² Gelled.
³ Not tested because of gellation time.

EXAMPLE 5

To each of several containers was added 16.0 grams of a 50% solution by weight of D.E.R.® 667, a bisphenol A type epoxy resin having an EEW of 1854 in a solvent mixture containing 50% by weight of xylene and 50% by weight of Dowanol® EEA and 2.0 grams of Cymel® 301, hexamethoxymethylmelamine. Then 5 grams of Dowanol® EEA containing the various catalysts are shown in the following Table V. Testing was the same as in Example 1.

TABLE V

| | Sample | |
|---|---|---|
| | A | B |
| Cymel ®301, grams | 2.0 | 2.0 |
| D.E.R. ®667 solution, grams | 16.0 | 16.0 |
| Isobutyl-p-toluene sulfonate, grams | 0.35 | |
| p-Toluene sulfonic acid,¹ grams | | 0.35 |
| Dowanol ®EEA, grams | 5.0 | 5.0 |
| Initial viscosity | G-H | H-I |
| Viscosity after: | | |
| 2 days | G-H | S |
| 5 days | H | X-Y |
| 6 days | H | Y-Z |
| 8 days | H | Z₁-Z₂ |
| 12 days | H | Z₆-Z₇ |
| 14 days | H | (²) |
| 30 days | I | |
| Properties of coating after baking at 350° F. for 30 minutes: | | |
| Coating thickness, mils | 1.2-1.4 | 1.2-1.5 |
| Sward hardness | 36.5 | 40.0 |
| ⅛" conical mandrel bend | (³) | (⁴) |
| Impact: | | |
| Forward | 100 | 20 |
| Reverse | 15 | <10 |
| H₂O resistance, hours | >24 | >24 |

¹ Prior art comparison.
² Gelled.
³ Paned.
⁴ Complete adhesion loss.

I claim:
1. A thermosettable resin composition comprising:
 (A) a hydroxyl-containing resin selected from the group comprising aromatic-based hydroxyl-containing epoxy resins, capped hydroxyl-containing aromatic-based epoxy resins and mixtures thereof;
 (B) a resin selected from the group consisting of a urea-aldehyde resin, a melamine-aldehyde resin and a partially etherified melamine-aldehyde resin; and
 (C) a reaction promoter selected from the group consisting of an alkyl phosphate, an aryl phosphate, an alkyl organic sulfonate and an aralkyl organic sulfonate;
wherein the quantity of the promoter is that quantity which upon complete hydrolysis would yield from about 0.5 to about 4.0 milliequivalents of acid for each 10 parts by weight of the total weight of resins A and B, and wherein the weight ratio of A to B is from about 1:1 to about 8:1.

2. The composition of claim 1 wherein the urea-aldehyde and partially etherified urea-aldehyde resins are urea-formaldehyde and partially etherified urea-formaldehyde resins.

3. The composition of claim 1 wherein the alkyl phosphate reaction promoter is diisobutyl monopropyl phosphate.

4. The composition of claim 1 wherein the alkyl phosphate is triethyl phosphate.

5. The composition of claim 1 wherein the aryl phosphate reaction promoter is tricresyl phosphate.

6. The composition of claim 1 wherein the aryl organic sulfonate is isobutyl-p-toluene sulfonate.

7. The composition of claim 1 wherein the weight ratio of A to B is from about 3:1 to about 5:1.

References Cited

UNITED STATES PATENTS

| 2,631,138 | 3/1953 | Dannenberg | 260—834 |
| 2,528,359 | 10/1950 | Greenlee | 260—834 |
| 2,528,360 | 10/1950 | Greenlee | 260—834 |
| 2,668,805 | 2/1954 | Greenlee | 260—834 |

(Other references on following page)

UNITED STATES PATENTS

| | | | |
|---|---|---|---|
| 2,824,850 | 2/1958 | Widmer | 260—834 |
| 2,826,562 | 3/1958 | Shokal | 260—834 |
| 3,367,991 | 2/1968 | Hicks | 260—834 |
| 3,392,150 | 7/1968 | Groll | 260—834 |

FOREIGN PATENTS

| | | | |
|---|---|---|---|
| 1,192,704 | 4/1959 | France | 260—834 |

OTHER REFERENCES

Handbook of Epoxy Resins, Henry Lee and Kris Neville; McGraw-Hill 1967, pp. 10–13, 24–24 and 24–25.

PAUL LIEBERMAN, Primary Examiner

U.S. Cl. X.R.

260—47 EC, 67.5, 849

UNITED STATES PATENT OFFICE
CERTIFICATE OF CORRECTION

Patent No. 3,651,169      Dated 21 March 1972

Inventor(s) Lem Davis, Jr.

It is certified that error appears in the above-identified patent and that said Letters Patent are hereby corrected as shown below:

Column 2, change the formulae between lines 4 and 12 to read:

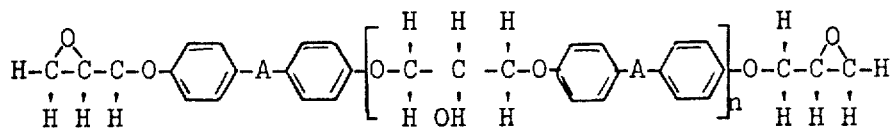

Column 2, line 39, change "resinh" to --resins--.

Column 3, line 43, delete "by" and insert --be--.

Column 4, change $R_4$ to --$R_1$-- in the formula between lines 21 and 25:

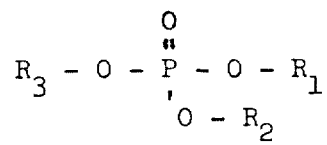

Column 7, line 41, insert --1.5-- between "tained" and "milliequivalents".

Signed and sealed this 25th day of July 1972.

(SEAL)
Attest:

EDWARD M. FLETCHER, JR.       ROBERT GOTTSCHALK
Attesting Officer      Commissioner of Patents

UNITED STATES PATENT OFFICE
CERTIFICATE OF CORRECTION

Patent No. 3,651,169  Dated March 21, 1972

Inventor(s) Lem Davis, Jr.

It is certified that error appears in the above-identified patent and that said Letters Patent are hereby corrected as shown below:

Column 4, line 50, cancel "$R_6$" and insert -- $R_8$ -- .
Table V, Column 8, line 28, cancel "paned" and insert -- passed -- ; line 40, after the comma (,) insert -- partially etherified urea-aldehyde resin, -- .

Signed and sealed this 12th day of December 1972.

(SEAL)
Attest:

EDWARD M. FLETCHER, JR.
Attesting Officer

ROBERT GOTTSCHALK
Commissioner of Patents